United States Patent
Peterson et al.

(10) Patent No.: US 12,024,172 B2
(45) Date of Patent: Jul. 2, 2024

(54) LANE ASSIST FOR DEVIATING FROM PREEXISTING TRAFFIC LANE

(71) Applicant: Lenovo (Singapore) Pte. Ltd., Singapore (SG)

(72) Inventors: Nathan Peterson, Oxford, NC (US); Russell Speight VanBlon, Raleigh, NC (US); Arnold Weksler, Raleigh, NC (US); Mark Delaney, Raleigh, NC (US); John C Mese, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 260 days.

(21) Appl. No.: 17/741,420

(22) Filed: May 10, 2022

(65) Prior Publication Data
US 2023/0365135 A1    Nov. 16, 2023

(51) Int. Cl.
*B60W 30/18* (2012.01)
*B60W 40/04* (2006.01)
*B60W 60/00* (2020.01)
*G06V 20/58* (2022.01)

(52) U.S. Cl.
CPC ...... *B60W 30/18163* (2013.01); *B60W 40/04* (2013.01); *B60W 60/0011* (2020.02); *G06V 20/58* (2022.01); *B60W 2420/403* (2013.01); *B60W 2552/50* (2020.02); *B60W 2556/10* (2020.02); *B60W 2556/50* (2020.02); *B60W 2556/65* (2020.02)

(58) Field of Classification Search
CPC .......... B60W 30/18163; B60W 40/04; B60W 40/06; B60W 40/064; B60W 40/068; B60W 60/0011; B60W 60/0017
See application file for complete search history.

(56) References Cited

U.S. PATENT DOCUMENTS

| | | |
|---|---|---|
| 9,188,985 B1 | 11/2015 | Hobbs et al. |
| 9,970,615 B1 | 5/2018 | Cardillo et al. |
| 10,309,789 B2 | 6/2019 | Ramasamy |

(Continued)

FOREIGN PATENT DOCUMENTS

| | | |
|---|---|---|
| WO | 2017068897 A1 | 4/2017 |
| WO | 2018026603 A1 | 2/2018 |

OTHER PUBLICATIONS

Norton et al., "Responding to a Signal Indicating That an Autonomous Driving Feature Has Been Overriden by Alerting Plural Vehicles", file history of related U.S. Appl. No. 16/793,184, filed Feb. 18, 2020.

(Continued)

*Primary Examiner* — John Kwon
(74) *Attorney, Agent, or Firm* — John M. Rogitz; John L. Rogitz

(57) ABSTRACT

In one aspect, at least one device may include at least one processor and storage accessible to the at least one processor. The storage may include instructions executable by the at least one processor to determine that a threshold amount of vehicles have taken a path deviating from a preexisting traffic lane at a particular area of a driving surface. Based on the determination, the instructions may be executable to provide, to one or more additional vehicles, location coordinates indicating the path deviating from the preexisting traffic lane at the particular area of the driving surface.

20 Claims, 6 Drawing Sheets

(56) References Cited

U.S. PATENT DOCUMENTS

| | | |
|---|---|---|
| 10,710,607 B2 | 7/2020 | Peterson et al. |
| 2011/0109469 A1 | 5/2011 | Trim |
| 2011/0143726 A1 | 6/2011 | Silva |
| 2013/0253767 A1* | 9/2013 | Lee ................. B60W 50/04 |
| | | 701/41 |
| 2014/0026065 A1 | 1/2014 | Wang |
| 2014/0195072 A1 | 7/2014 | Graumann |
| 2014/0309864 A1 | 10/2014 | Ricci |
| 2016/0280236 A1 | 9/2016 | Otsuka |
| 2017/0008523 A1 | 1/2017 | Christensen et al. |
| 2017/0219364 A1 | 8/2017 | Lathrop et al. |
| 2017/0259832 A1 | 9/2017 | Lathrop et al. |
| 2017/0301235 A1 | 10/2017 | Endo |
| 2017/0314957 A1 | 11/2017 | Mimura et al. |
| 2017/0370740 A1 | 12/2017 | Nagy et al. |
| 2018/0100742 A1 | 4/2018 | Greenwood et al. |
| 2018/0113460 A1 | 4/2018 | Koda et al. |
| 2018/0162387 A1 | 6/2018 | Sung et al. |
| 2018/0237012 A1 | 8/2018 | Jammoussi et al. |
| 2018/0252541 A1 | 9/2018 | Kesting et al. |
| 2018/0259956 A1 | 9/2018 | Kawamoto |
| 2018/0299281 A1 | 10/2018 | Takashima |
| 2019/0064804 A1 | 2/2019 | Frazzoli et al. |
| 2020/0019165 A1 | 1/2020 | Levandowski et al. |
| 2020/0208991 A1* | 7/2020 | Chen ................. G06N 20/00 |
| 2020/0209864 A1* | 7/2020 | Chen ................. G01C 21/3438 |
| 2020/0211370 A1* | 7/2020 | Chen ................. G06V 20/588 |
| 2021/0024091 A1* | 1/2021 | Lee ................. B60W 60/0027 |
| 2021/0207969 A1* | 7/2021 | Bang ................. B60W 30/0956 |
| 2022/0324421 A1* | 10/2022 | Giovanardi ........... B60W 40/06 |

OTHER PUBLICATIONS

Peterson et al., "Systems and Methods for Identifying First Route to Destination as Involving Less Human Driving of Vehicle than Second Route to Destination", file history of related U.S. Appl. No. 15/894,584, filed Feb. 12, 2018.

* cited by examiner

600

602 Note:

There Is A Construction Zone Coming Up And You Have To Merge Into The Oncoming Traffic Lane And Drive In A Group For 0.5 Miles.

608 Allow Vehicle/Server To Drive New Route Autonomously

700

Settings

702 ☐ Enable Dynamic Lane Discovery And Assist Based On Lane Deviations Of Others

704    706

Override: ☐ % Of Autonomous Vehicle Systems/Lane Assists Overridden Within Last ☐ Minutes
    708

LANE ASSIST FOR DEVIATING FROM PREEXISTING TRAFFIC LANE

FIELD

The disclosure below relates to technically inventive, non-routine solutions that are necessarily rooted in computer technology and that produce concrete technical improvements. In particular, the disclosure below relates to techniques for lane assist for deviating from a preexisting traffic lane.

BACKGROUND

As recognized herein, for construction areas and other hazard areas, current lane assist technologies may not work as well as intended since the lane-assist computers may not be aware of the relevant hazard, aware of temporary lane lines that exist, and/or aware of existing lane lines being removed during construction. However, the lane-assist computers might still try to assist the vehicle in remaining within the previously-known lane lines in these situations, leading to a potential safety hazard. There are currently no adequate solutions to the foregoing computer-related, technological problem.

SUMMARY

Accordingly, in one aspect at least one device includes at least one processor and storage accessible to the at least one processor. The storage includes instructions executable by the at least one processor to determine that a threshold amount of vehicles have overridden a lane assist feature at a particular area of a driving surface. Based on the determination, the instructions are executable to provide, to one or more additional vehicles, location coordinates indicating a path taken by the threshold amount of vehicles.

In some examples, the threshold amount of vehicles may be established by a threshold number or percentage of vehicles within a threshold amount of time that have overridden the lane assist feature at the particular area. Additionally, in some example embodiments the location coordinates may be first location coordinates, and the instructions may be executable to receive different sets of location coordinates from plural vehicles of the threshold amount of vehicles to identify the first location coordinates based on the different sets.

In some example implementations, the location coordinates may establish a route for an autonomously-driven vehicle to drive over a traffic dividing line, such as an oncoming-traffic dividing line, through at least part of the area. Also in some example implementations, the location coordinates may establish a route for an autonomously-driven vehicle to drive into an oncoming traffic lane through at least part of the area. Additionally or alternatively, the location coordinates may establish a route for an autonomously-driven vehicle to drive from a first traffic lane into a second traffic lane, where both the first and second traffic lanes may be for driving the same direction.

Moreover, in some example embodiments the location coordinates may be first location coordinates, and the instructions may be executable to access second location coordinates indicating the locations of construction cones to identify the first location coordinates based on the second location coordinates. The threshold amount of vehicles may be a first threshold amount of vehicles, the one or more additional vehicles may be first additional vehicles, the path may be a first path, and the instructions may even be executable to determine that a second threshold amount of vehicles are no longer traveling the first path to, based on the determination that the second threshold amount of vehicles are no longer traveling the first path, provide third location coordinates to one or more second additional vehicles indicating a second path taken by the second threshold amount of vehicles. The second path might be for a preexisting traffic lane, for example.

Additionally or alternatively, the threshold amount of vehicles may be a first threshold amount of vehicles, the one or more additional vehicles may be first additional vehicles, the path may be a first path, and the instructions may be executable to determine that the construction cones have been removed from the locations of the second location coordinates to, based on the determination that the construction cones have been removed from the locations of the second location coordinates, provide third location coordinates to second additional vehicles indicating a second path to travel.

Also if desired, in some examples the instructions may be executable to receive camera input, execute object recognition to identify the construction cones using the camera input, and execute computer vision to identify the second location coordinates responsive to identifying the construction cones. The instructions might even be executable to access the second location coordinates by receiving the second location coordinates from at least one of the threshold amount of vehicles.

Also in some example implementations, the at least one device may include at least a first vehicle of the threshold amount of vehicles.

In another aspect, a method includes determining, at one or more devices, that a threshold amount of vehicles have taken a path deviating from a preexisting traffic lane at a particular area of a driving surface. The method also includes, based on the determining, providing location coordinates to one or more additional vehicles indicating the path deviating from the preexisting traffic lane at the particular area of the driving surface.

Thus, in certain examples the method may include, based on the determining, controlling an on-board computer of a first vehicle of the one or more additional vehicles to control the first vehicle to travel the path deviating from the preexisting traffic lane at the particular area of the driving surface.

Also in certain examples, the location coordinates may be first location coordinates, the threshold amount of vehicles may be a first threshold amount of vehicles, the one or more additional vehicles may be first additional vehicles, the path may be a first path, and the method may include determining that a second threshold amount of vehicles are no longer taking the first path. In these examples, the method may also include, based on the determining that the second threshold amount of vehicles are no longer taking the first path, providing second location coordinates to one or more second additional vehicles indicating a second path corresponding to the preexisting traffic lane.

In still another aspect, at least one computer readable storage medium (CRSM) that is not a transitory signal includes instructions executable by at least one processor to determine that a threshold amount of vehicles have taken a path deviating from a preexisting traffic lane at a particular area of a driving surface. The instructions are also executable to, based on the determination, provide location indications to one or more additional vehicles indicating the path deviating from the preexisting traffic lane at the particular area of the driving surface.

In some example embodiments, the instructions may be executable to control a first vehicle of the one or more additional vehicles to travel, based on the location indications, the path deviating from the preexisting traffic lane at the particular area of the driving surface.

Also in some examples, the location indications may be first location indications, the threshold amount of vehicles may be a first threshold amount of vehicles, the one or more additional vehicles may be first additional vehicles, and the path may be a first path. Here the instructions may be executable to determine that a second threshold amount of vehicles are no longer taking the first path and, based on the determination that the second threshold amount of vehicles are no longer taking the first path, provide second location indications to one or more second additional vehicles indicating a second path corresponding to the preexisting traffic lane.

The details of present principles, both as to their structure and operation, can best be understood in reference to the accompanying drawings, in which like reference numerals refer to like parts, and in which:

DETAILED DESCRIPTION

Figure 1:
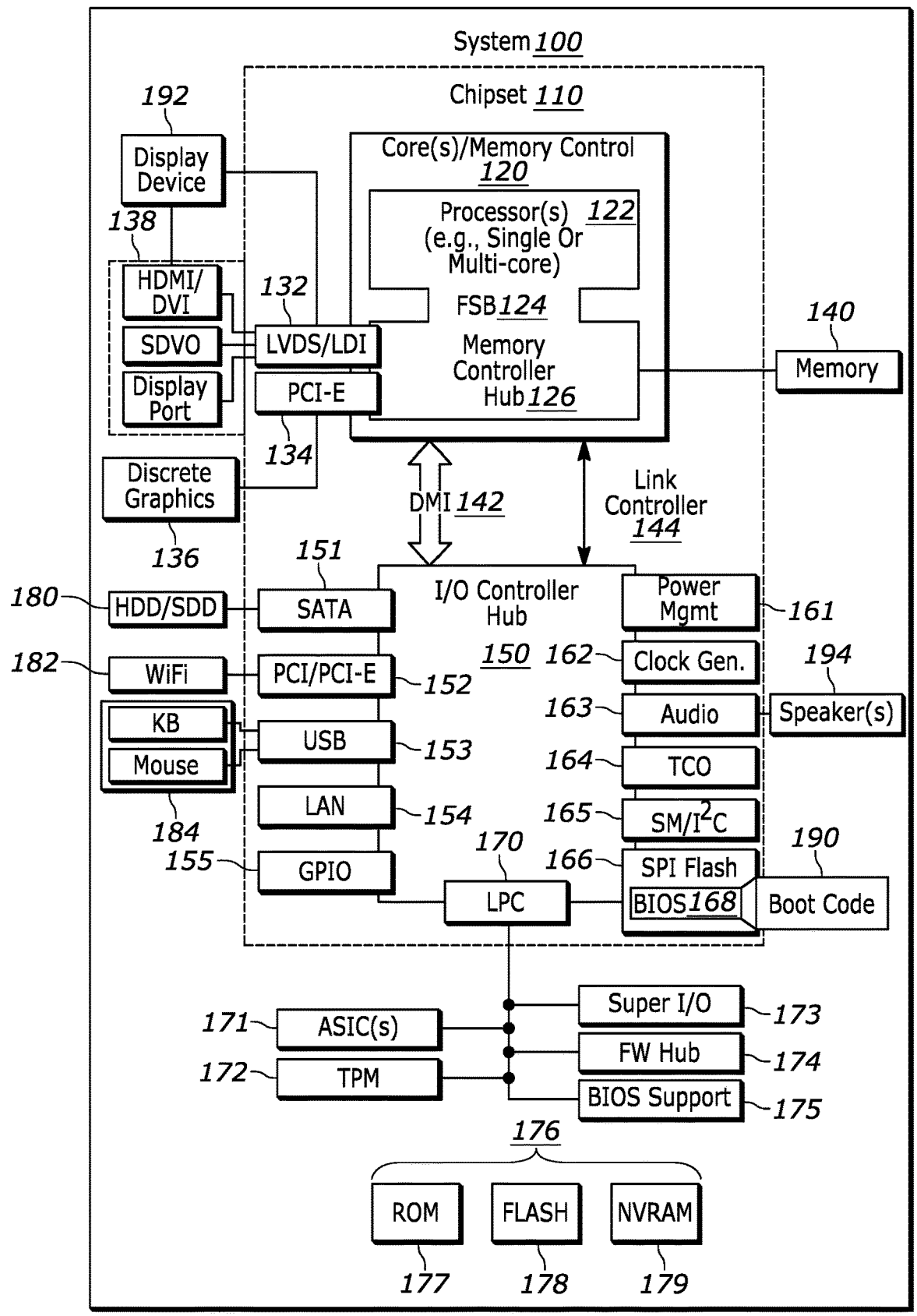
FIG. 1 is a block diagram of an example system consistent with present principles.

Among other things, the detailed description below discusses changing or reducing lane assist sensitivity in certain areas. For example, based on crowd sourcing, if a number of vehicles have lane assist triggers in the same location, the lane assist behavior may be modified. Thus, lane assist may learn which lane lines are correct or current based on what the vehicles/drivers are actually doing in these areas.

Providing an example, if one hundred vehicles had their lane assist triggered at a certain area (e.g., based on unexpected lane deviations or a threshold number of vehicles activating their hazard/emergency lights/blinkers), and all of them did something that the lane assist disagreed with, the lane assist may learn from this and update/train the rest of the vehicles that will be driving in this same area in the future. The subsequent vehicles that get this update/warning could either disengage lane assist altogether in this area so the user can manually drive through the area, or the vehicles may learn and apply what is believed to be the accurate maneuver or lane action (e.g., and establish/apply new corresponding lane assist boundaries). Thus, subsequent drivers may not encounter the lane assist's steering wheel resistance in these areas as might otherwise occur.

Accordingly, the foregoing may be used in any situation where a relatively high threshold percentage of people did something different from what the lane assist suggested they do. This data may be passed up to the cloud and back down to update other vehicles.

What's more, in certain examples present principles may be applied not only in instances where a new or different traffic pattern exists (e.g., in a construction zone), but also where an existing lane or traffic pattern has washed-out or non-existent lane markings, which also might otherwise cause an issue for lane assist technology.

Thus, additional sensor fusion and on-device artificial intelligence may be enabled through present principles to address an issue that exists across many smart vehicle types and manufacturers.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
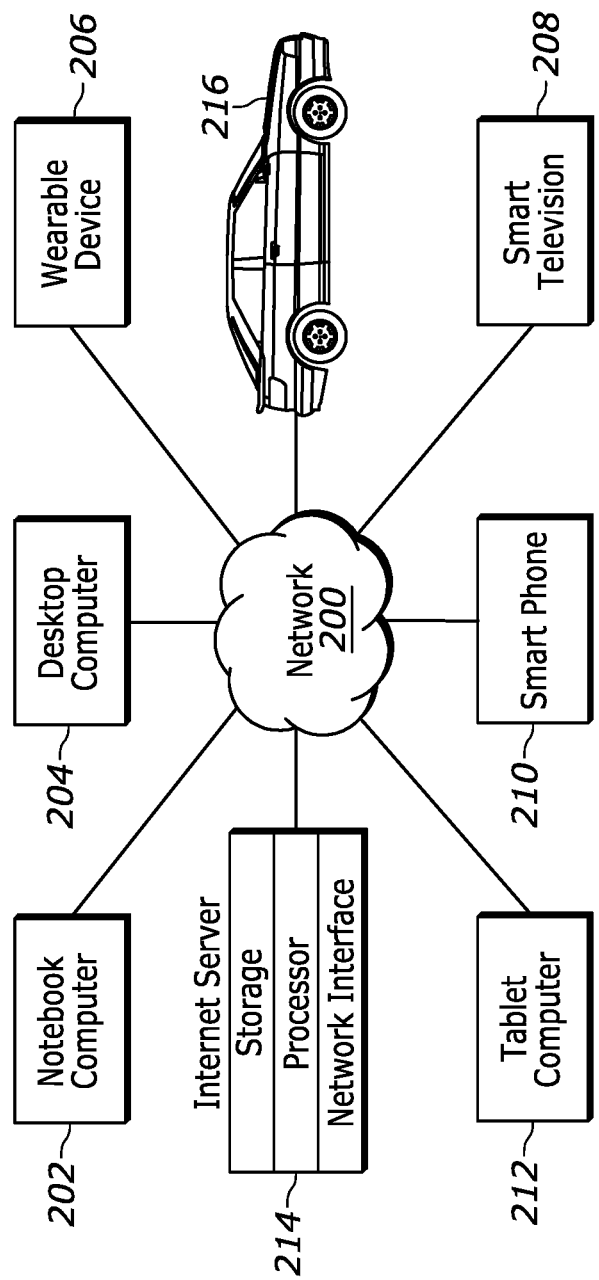
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 may be configured to communicate with each other over the network 200 to undertake present principles.

Figure 3:
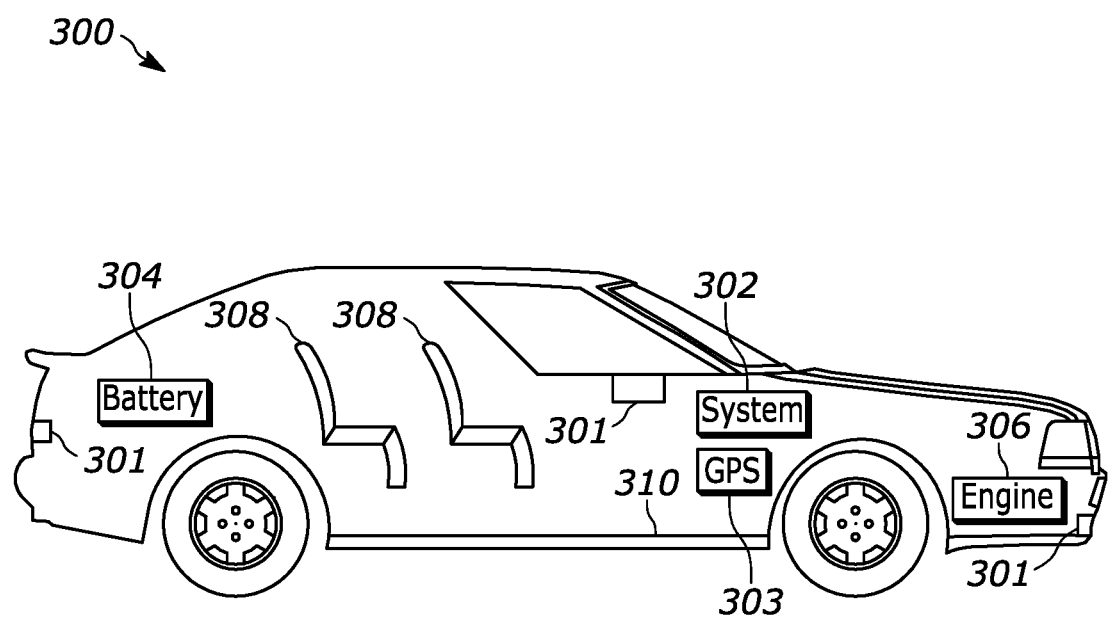
FIG. 3 shows an example vehicle that may be used consistent with present principles.

FIG. 3 shows an example vehicle 300 that may be similar to the vehicle 216 referenced above, e.g., a car or pickup truck or sport utility vehicle or tractor trailer/semitruck. The vehicle 300 may include an onboard computer system 302 that may include components such as those set forth above in reference to the system 100 in order to operate consistent with present principles. The system 302 may be connected to and/or communicate with one or more cameras 301 on the vehicle 300, such as a respective camera 301 facing outward from the front, back, and each side of the vehicle 300 for vehicle location tracking using computer vision while the vehicle travels along a driving surface consistent with present principles. The system 302 may also include or communicate with a GPS transceiver 303 also for vehicle location tracking consistent with present principles.

Additionally, the system 302 may communicate with and control a battery and/or battery pack 304 that may provide power to other parts of the vehicle 300 and/or that may propel the vehicle 300 (e.g., in electric and hybrid vehicle embodiments). The system 302 may further communicate with and control an internal combustion engine 306 that can provide power to propel the vehicle 300 separately from or in conjunction with power from the battery 304 to propel the vehicle 300. The engine 306 may be a fossil fuels-powered engine, such as a gasoline-powered engine or a diesel-powered engine. The vehicle 300 may also include plural seat or chair assemblies 308 that include respective seats in which a driver and passengers of the vehicle 300 may sit. The vehicle 300 may also include a drive train and chassis 310.

It is to be further understood that the vehicle 300 may include still other components not shown for simplicity, such as brakes for slowing and stopping the vehicle as well as a regenerative braking mechanism for harvesting kinetic energy during braking of the vehicle to charge battery cells within the battery 304. Still other ways of charging the vehicle's battery may be used, such as charging the battery using energy taken from the engine 306 (e.g., using an alternator). The vehicle 300 may also include other mechanisms, including a steering wheel assembly that may include a steering wheel that a user may turn to turn the vehicle 300 left or right. Various mirror assemblies may also be included, including a rear view mirror assembly having a rear view mirror mounted to the windshield of the vehicle 300 as well as side view mirror assemblies with side view mirrors mounted to the front doors of each side of the vehicle 300.

The vehicle may also include a suspension system and a heating ventilation and air conditioning (HVAC) system, for example.

Figure 4:
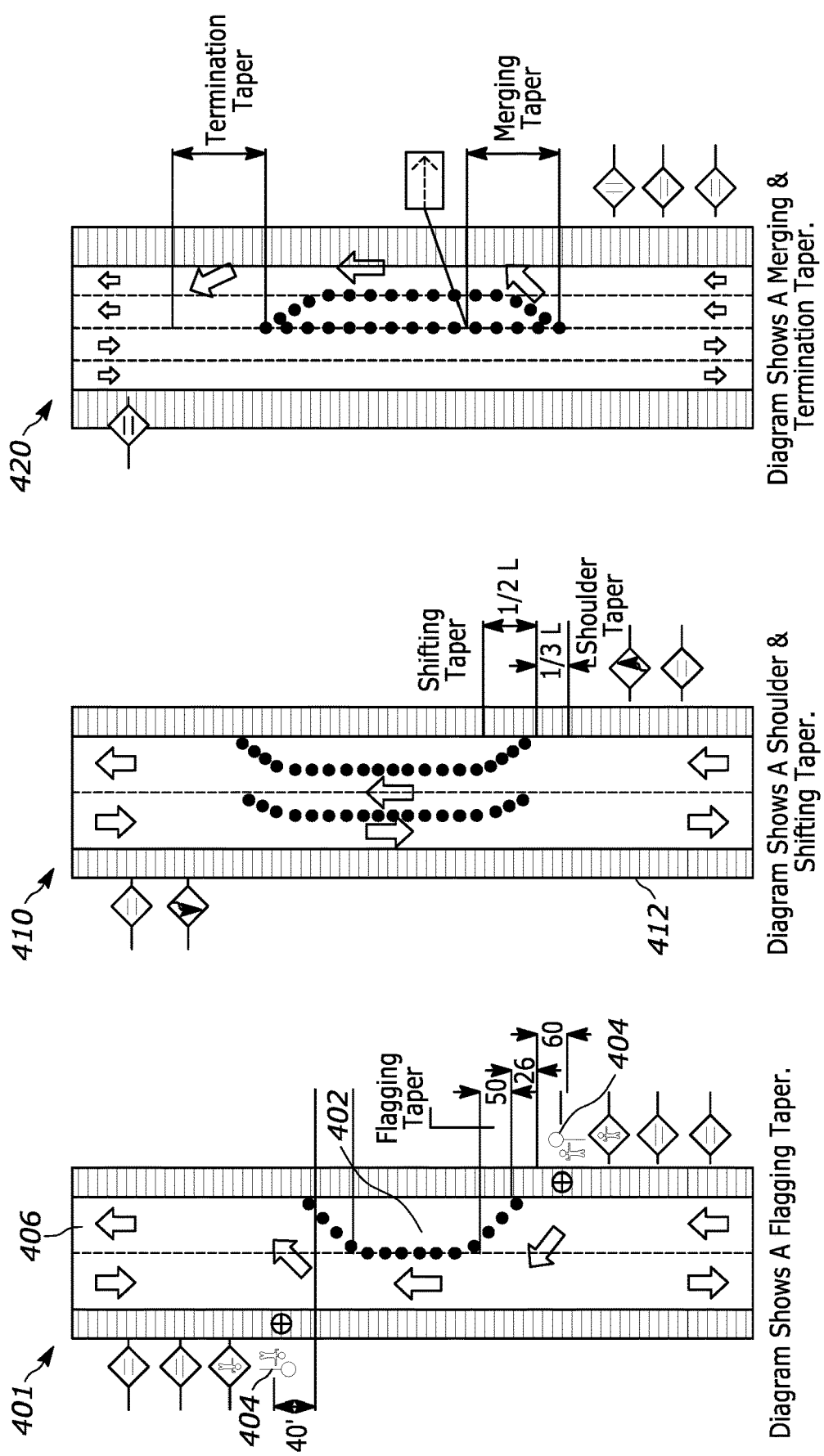
FIGS. 4a-4c show various traffic situations in which present principles may be applied.

Turning now to FIGS. 4a-4c, various example driving situations are illustrated via the schematic diagrams shown in these figures. The driving situations may entail a vehicle such as the vehicle 300 deviating from a preexisting traffic lane in which the vehicle 300 is already traveling at a particular area of a driving surface in order to take an unexpected or dynamic driving path along the driving surface. In certain situations, this may even include overriding a lane assist feature to deviate from the preexisting lane. The lane assist feature might be executed by itself as a stand-alone driver assist feature while the user drives the vehicle 300 manually, with the lane assist feature providing slight resistance at the steering wheel should the user try to turn out of the preexisting lane. Or the lane assist feature may be part of a larger autonomous driving application operated by the computer system of the vehicle 300 to help the vehicle 300 stay within its current lane while the vehicle 300 is autonomously driven by the system 302.

Note that each example situation shown in FIGS. 4a-4c relates to road construction going on in the relevant area. However, present principles may be applied in other situations as well, such as police-instigated traffic control situations, vehicle accident situations, etc.

In any case, as shown in FIG. 4a, a particular area 401 of a bi-directional two-lane driving surface is shown with a portion 402 of a northbound lane being cordoned off so that, under traffic control by construction workers 404, northbound traffic is diverted into the southbound lane for a particular stretch of the driving surface before being routed back into the northbound lane. As such, northbound vehicles will have to drive over an oncoming-traffic dividing line in groups while southbound traffic is stopped in order to travel past the portion 402. Absent present principles, an autonomously-driven vehicle may not know of this new, temporary route, and the steering wheels of vehicles driven manually but with a lane assist feature active may apply resistance to turning out of the northbound lane when the drivers try to steer their vehicles over the oncoming-traffic dividing line since the lane-assist application may also not know of the new route.

However, consistent with present principles, responsive to a threshold amount of northbound vehicles having overridden the lane assist feature or overall autonomous driving mode (which, again, may itself include a lane assist feature) to steer into the southbound lane when prompted by the construction workers 404, additional vehicles may be warned about the deviation and provided location coordinates to follow the new route. In some examples, responsive to the additional vehicles receiving the warning and new location coordinates, those additional vehicles may autonomously turn off their own lane assist/autonomous driving features when driving through the same area 401 so that the human drivers of those additional vehicles may manually steer the additional vehicles along the new route without fighting against the lane assist or autonomous driving feature that might otherwise provide resistance to turning at the steering wheel and try to keep the vehicles in their current preexisting lane even though part of it is closed, causing a safety hazard.

However, in other examples the lane assist/autonomous driving features of the additional vehicles may themselves apply the new coordinates and follow the new route for northbound traffic using the new location coordinates reported by the prior vehicles that traveled the new, temporary route. Thus, for a stand-alone lane assist feature, the new coordinates may be used to provide steering wheel resistance from deviating from the new path. For full autonomous driving, the autonomous driving application may follow the new route.

FIG. 4b shows another example similar to the situation of FIG. 4a above, except that for an area 410 of a driving surface, northbound vehicles have to deviate from a preexisting lane in which they are already traveling to cross and straddle the oncoming traffic dividing line for a certain length of the driving surface (rather than fully merging into the southbound lane per FIG. 4a). Also per this example, southbound vehicles may have to drive at least partially on the shoulder 412 of the driving surface. Responsive to a threshold amount of northbound vehicles reporting the new northbound route and/or overriding their lane assist/autonomous driving features, additional northbound vehicles may be informed and turn off their own lane assist/autonomous driving features for manual driving, or the features themselves may be executed to follow the new, temporary route for northbound traffic that straddles the oncoming-traffic dividing line as shown. Additionally, responsive to a threshold amount of southbound vehicles reporting the new southbound route partially onto the shoulder 412 and/or overriding their own lane assist/autonomous driving features, additional southbound vehicles may turn off their own lane assist/autonomous driving features for manual driving, or the features themselves may be executed to follow the new, temporary route for southbound traffic as reported by prior southbound vehicles.

FIG. 4c shows yet another example. Here, for an area 420 of a driving surface, northbound vehicles may have to deviate from one preexisting northbound lane in which they are already traveling to cross and straddle a traffic dividing line and ultimately fully enter another northbound lane for a certain length of the driving surface. Thus, responsive to a threshold amount of northbound vehicles reporting the new northbound route and/or overriding their lane assist/autonomous driving features, additional northbound vehicles may turn off their own lane assist/autonomous driving features for manual driving, or may execute the features to follow the new, temporary route for northbound traffic that merges two northbound lanes into one lane (as reported by prior northbound vehicles).

Figure 5:
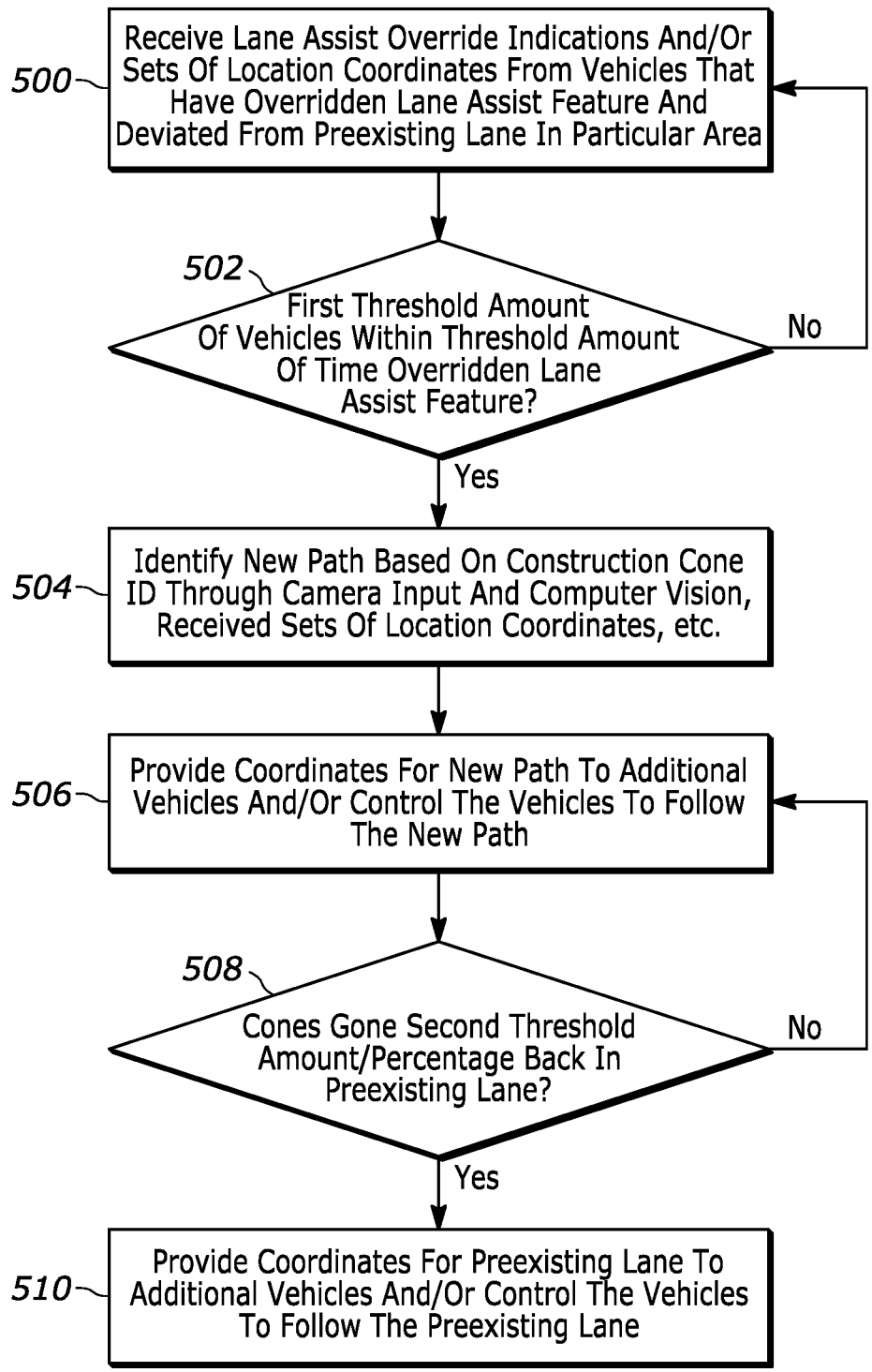
FIG. 5 illustrates example logic in example flow chart format that may be executed by a device consistent with present principles.

Referring now to FIG. 5, it shows example logic consistent with present principles that may be executed by a device such as the system 100, a vehicle's onboard computer system and/or connected smartphone (or other smart device), and/or a remotely-located coordinating server in any appropriate combination. Note that while the logic of FIG. 5 is shown in flow chart format, other suitable logic may also be used.

Beginning at block 500, the device may receive indications of lane assist overrides from vehicles traveling along a driving surface in a particular area. For example, at block 500 the device may receive wireless transmissions from those vehicles indicating that the vehicles' respective lane assist features/autonomous driving modes have been overridden by the vehicles' human drivers for the drivers to manually drive the vehicles themselves through the area.

Additionally, at block 500 the device may receive a set of location coordinates from each of the reporting vehicles indicating the new route those vehicles have driven through the area, which may deviate from a same preexisting traffic lane in which those vehicles were already driving as described above in reference to FIGS. 4a-4c. The location coordinates for the new route as received from each vehicle may be GPS coordinates setting forth the new route as received from a GPS transceiver on the respective vehicle itself. The location coordinates may also be GPS coordinates derived from computer vision-based location tracking as mapped to GPS coordinates using location data reported by the respective vehicle's GPS transceiver itself for even more precision.

Additionally or alternatively, but also at block 500, responsive to the received override indications, in certain examples the device executing the logic of FIG. 5 may itself track the vehicles' locations and identify the new route based on respective GPS coordinates reported at over time by the vehicles as the vehicles travel the new route. The device of FIG. 5 may also identify the new route based on image streams from one or more cameras on the vehicles to derive the location coordinates for the new route using computer vision as set forth above.

But regardless of whether the vehicles report the new route or the device of FIG. 5 identifies it itself, note that other techniques for identifying the location coordinates for the new route may also be used. For example, dead reckoning may be executed using accelerometer and gyroscope input from motion sensors on the vehicles to identify the new route relative to known GPS coordinates for the preexisting route from which the vehicles are deviating.

From block 500 the logic may then proceed to decision diamond 502. At diamond 502 the device may determine whether a first threshold amount of vehicles have overridden the lane assist feature/autonomous driving at the particular area of the driving surface or have otherwise taken a path deviating from the preexisting traffic lane at the particular area of the driving surface. A negative determination at diamond 502 may cause the logic to revert back to block 500 to proceed again therefrom.

However, an affirmative determination may instead cause the logic to proceed to block 504. At block 504 the device may, if it has not done so already, identify the new path taken by the first threshold amount of vehicles. The new path may be identified as already described above, such as based on GPS coordinates, based on computer vision and known GPS coordinates to deduce other GPS coordinates, based on dead reckoning and known GPS coordinates to deduce other GPS coordinates, etc.

For example, at block 504 the device may access GPS coordinates of the left and right bounds of the new route within which vehicles should stay to travel the new route, where the left and right bounds may be established by traffic cones establishing a makeshift traffic lane. The GPS coordinates for the left and right bounds may be identified by one or more of the first threshold amount of vehicles themselves after the vehicles have determined and reported the coordinates, or the GPS left and right bound coordinates may be identified at the device of FIG. 5 itself. GPS coordinates for the center of the new makeshift lane, which may establish the new path, may then be determined as GPS coordinates in the middle of the left and right bounds.

Thus, in some cases the device of FIG. 5 may receive camera input (e.g., a real-time camera stream) from one or more of the first threshold amount of vehicles to then execute object recognition to identify the construction cones establishing the new lane and, responsive to identifying the construction cones, execute computer vision to identify the location coordinates of the left and right bounds. Additionally or alternatively, the reporting vehicle(s) themselves may similarly execute object recognition and computer vision to identify the location coordinates of the left and right bounds to then report those coordinates to the device of FIG. 5 (and/or the lane-center coordinates).

From block 504 the logic may then proceed to block 506. At block 506 the device may provide the location coordinates for the new path to additional vehicles that are traveling toward the same area and/or in the same preexisting lane, such as vehicles within a threshold distance or threshold driving time of where the new path begins, so that the lane assist/autonomous driving features of those additional vehicles can follow the new path (or at the very least warn the driver of the new path the driver is to follow themselves). As part of providing the location coordinates, in certain examples the device may even remotely-control the on-board computers of one or more of the additional vehicles to control those vehicles to travel the new path, or at least adjust the vehicles' lane assist features accordingly (e.g., where the device is a server and remote autonomous driving/lane assist modification has been enabled).

From block 506 the logic may then proceed to decision diamond 508. At diamond 508 the device may determine whether a second threshold amount of vehicles are no longer taking the new path, and/or determine whether the previously-identified construction cones have been removed from their previous locations at the left and right bounds of the new route (e.g., again using object recognition). This might occur if, for example, construction has ended for the day and traffic has been diverted back to the preexisting configuration, or a traffic accident is no longer blocking a certain lane of traffic. A negative determination at diamond 508 may cause the logic to revert back to block 506 to proceed again from there.

However, responsive to an affirmative determination at diamond 508 the logic may instead proceed to block 510. At block 510 the device may provide, to still other vehicles traveling through the area, different location coordinates indicating a second path to drive that corresponds to the preexisting traffic lane itself (e.g., for a lane assist feature to apply the preexisting traffic lane coordinates for keeping those vehicles within the preexisting traffic lane again). Also at block 510, in some examples the device may even control one or more of the subsequent vehicles themselves to follow this second path (for the preexisting lane). Or in some examples, at block 510 the device may simply indicate to the subsequent vehicles that the hazard or traffic issue has been resolved and hence that preexisting traffic lanes and patterns should be followed.

Figures 6, 7:
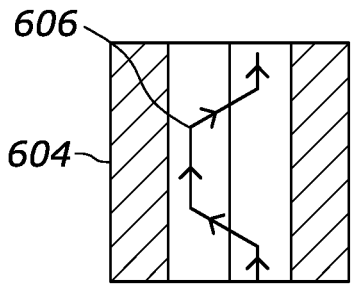
FIG. 6 shows an example graphical user interface (GUI) that may be presented to indicate an upcoming irregular traffic pattern of which a vehicle's computer system/lane assist has been made aware.
FIG. 7 shows an example GUI that may be presented to configure one or more settings of a device to operate consistent with present principles.

However, before moving on to FIG. 6, further note that in some examples the second path need not necessarily correspond to a preexisting lane. Instead, it might pertain to a second makeshift lane that has been created from or is different from the initial makeshift lane. Thus, the second makeshift lane's coordinates might be applied at block 510 responsive to the second threshold number of vehicles following the second makeshift lane (rather than the preexisting lane as in the paragraph immediately above). Thus, shifting, dynamic traffic patterns may be accounted for as road construction occurs or another traffic situation changes.

Continuing the detailed description in reference to FIG. 6, it shows an example graphical user interface (GUI) 600 that may be presented on the display of a given vehicle or connected/paired smartphone (or other smart device). The GUI 600 may be presented responsive to receiving or identifying new location coordinates for a new path for the vehicle to travel based on the new path being reported by other vehicles that have already passed through the area as described above.

Accordingly, as shown in FIG. 6, the GUI 600 may include a prompt 602 that there is a construction zone coming up and that the vehicle will have to merge into an oncoming traffic lane and drive in a group of cars going the same direction under traffic control. In some examples, the prompt 602 may even indicate the length of the detour/new path, which in this example is half a mile. Also if desired, a map 604 may be presented as part of the GUI 600 to graphically show the new route 606 relative to preexisting traffic lanes for the same driving surface. If desired, the GUI 600 may even include a selector 608 that may be selectable to provide a command for the vehicle or a remotely-located server to drive the vehicle through the new route autonomously (without the human driver controlling the steering wheel themselves).

Now in reference to FIG. 7, an example GUI 700 is shown that may be presented on the display of a device configured to undertake present principles to configure or enable one or more settings of that device to operate as described herein. For example, the GUI 700 may be presented on the display of a vehicle, paired smartphone, or remotely-located server. The settings GUI 700 may therefore be reached by navigating an app menu or a settings menu of the vehicle, for example.

Accordingly, as shown in FIG. 7, the GUI 700 may include an option 702 that may be selectable a single time via touch or cursor input to the adjacent check box to set or enable the device to undertake present principles for multiple future driving instances. For example, selection of the option 702 may configure the device to execute the logic of FIG. 5 for multiple different driving instances over different makeshift driving routes.

If desired, in some examples the GUI 700 may also include a setting 704 at which the first threshold amount of vehicles of FIG. 5 may be set. As shown in FIG. 7, the first threshold amount may be expressed as a percentage of total vehicles to travel a given area, and may be established based on based on numerical input to input box 706 using a hard or soft keyboard. However, in other examples the input box 706 may be used to establish the first threshold amount of vehicles as a specific threshold number of vehicles.

Either way, if desired the first threshold amount of vehicles may be defined as a threshold amount of vehicles within a specific threshold amount of time. The threshold amount of time may be established based on numerical input to input box 708. Thus, in certain examples by limiting the threshold amount of vehicles to vehicles traveling the same area within a threshold amount of time (like within the most-recent last five minutes), an actual new path that should be followed may be identified while eliminating some false positives that might otherwise occur through routine lane changes and such that vehicles might otherwise perform over longer periods of time under normal circumstances.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least one device, comprising:
   at least one processor; and
   storage accessible to the at least one processor and comprising instructions executable by the at least one processor to:
   determine that a threshold amount of vehicles have overridden a lane assist feature at a particular area of a driving surface; and
   based on the determination, provide, to one or more additional vehicles, location coordinates indicating a path taken by the threshold amount of vehicles.

2. The at least one device of claim 1, wherein the threshold amount of vehicles is established by a threshold number or percentage of vehicles within a threshold amount of time that have overridden the lane assist feature at the particular area.

3. The at least one device of claim 1, wherein the location coordinates are first location coordinates, and wherein the instructions are executable to:
   receive different sets of location coordinates from plural vehicles of the threshold amount of vehicles; and
   identify the first location coordinates based on the different sets.

4. The at least one device of claim 1, wherein the location coordinates establish a route for an autonomously-driven vehicle to drive over a traffic dividing line through at least part of the area.

5. The at least one device of claim 4, wherein the traffic dividing line is an oncoming-traffic dividing line.

6. The at least one device of claim 1, wherein the location coordinates establish a route for an autonomously-driven vehicle to drive into an oncoming traffic lane through at least part of the area.

7. The at least one device of claim 1, wherein the location coordinates establish a route for an autonomously-driven vehicle to drive from a first traffic lane into a second traffic lane, wherein both the first and second traffic lanes are for driving the same direction.

8. The at least one device of claim 1, wherein the location coordinates are first location coordinates, and wherein the instructions are executable to:
   access second location coordinates indicating the locations of construction cones; and
   identify the first location coordinates based on the second location coordinates.

9. The at least one device of claim 8, wherein the threshold amount of vehicles is a first threshold amount of vehicles, wherein the one or more additional vehicles are first additional vehicles, wherein the path is a first path, and wherein the instructions are executable to:
   determine that a second threshold amount of vehicles are no longer traveling the first path; and
   based on the determination that the second threshold amount of vehicles are no longer traveling the first path, provide, to one or more second additional vehicles, third location coordinates indicating a second path taken by the second threshold amount of vehicles.

10. The at least one device of claim 9, wherein the second path is for a preexisting traffic lane.

11. The at least one device of claim 8, wherein the threshold amount of vehicles is a first threshold amount of vehicles, wherein the one or more additional vehicles are first additional vehicles, wherein the path is a first path, and wherein the instructions are executable to:
- determine that the construction cones have been removed from the locations of the second location coordinates; and
- based on the determination that the construction cones have been removed from the locations of the second location coordinates, provide, to second additional vehicles, third location coordinates indicating a second path to travel.

12. The at least one device of claim 8, wherein the instructions are executable to:
- receive camera input;
- execute object recognition to identify the construction cones using the camera input; and
- responsive to identifying the construction cones, execute computer vision to identify the second location coordinates.

13. The at least one device of claim 8, wherein the instructions are executable to:
- access the second location coordinates by receiving the second location coordinates from at least one of the threshold amount of vehicles.

14. The at least one device of claim 1, comprising at least a first vehicle of the threshold amount of vehicles.

15. A method, comprising:
- determining, at one or more devices, that a threshold amount of vehicles have taken a path deviating from a preexisting traffic lane at a particular area of a driving surface; and
- based on the determining, providing, to one or more additional vehicles, location coordinates indicating the path deviating from the preexisting traffic lane at the particular area of the driving surface.

16. The method of claim 15, comprising:
- based on the determining, controlling an on-board computer of a first vehicle of the one or more additional vehicles to control the first vehicle to travel the path deviating from the preexisting traffic lane at the particular area of the driving surface.

17. The method of claim 15, wherein the location coordinates are first location coordinates, wherein the threshold amount of vehicles is a first threshold amount of vehicles, wherein the one or more additional vehicles are first additional vehicles, wherein the path is a first path, and wherein the method comprises:
- determining that a second threshold amount of vehicles are no longer taking the first path; and
- based on the determining that the second threshold amount of vehicles are no longer taking the first path, providing, to one or more second additional vehicles, second location coordinates indicating a second path corresponding to the preexisting traffic lane.

18. At least one computer readable storage medium (CRSM) that is not a transitory signal, the at least one computer readable storage medium comprising instructions executable by at least one processor to:
- determine that a threshold amount of vehicles have taken a path deviating from a preexisting traffic lane at a particular area of a driving surface; and
- based on the determination, provide, to one or more additional vehicles, location indications indicating the path deviating from the preexisting traffic lane at the particular area of the driving surface.

19. The CRSM of claim 18, wherein the instructions are executable to:
- control a first vehicle of the one or more additional vehicles to travel, based on the location indications, the path deviating from the preexisting traffic lane at the particular area of the driving surface.

20. The CRSM of claim 18, wherein the location indications are first location indications, wherein the threshold amount of vehicles is a first threshold amount of vehicles, wherein the one or more additional vehicles are first additional vehicles, wherein the path is a first path, and wherein the instructions are executable to:
- determine that a second threshold amount of vehicles are no longer taking the first path; and
- based on the determination that the second threshold amount of vehicles are no longer taking the first path, provide, to one or more second additional vehicles, second location indications indicating a second path corresponding to the preexisting traffic lane.

* * * * *